Oct. 2, 1928.

P. L. TENNEY 1,686,047

TRANSMISSION LOCKING DEVICE

Filed Aug. 2, 1926  2 Sheets-Sheet 1

Inventor
Perry L. Tenney
By Blackmore, Spencer & Hiti
Attorneys

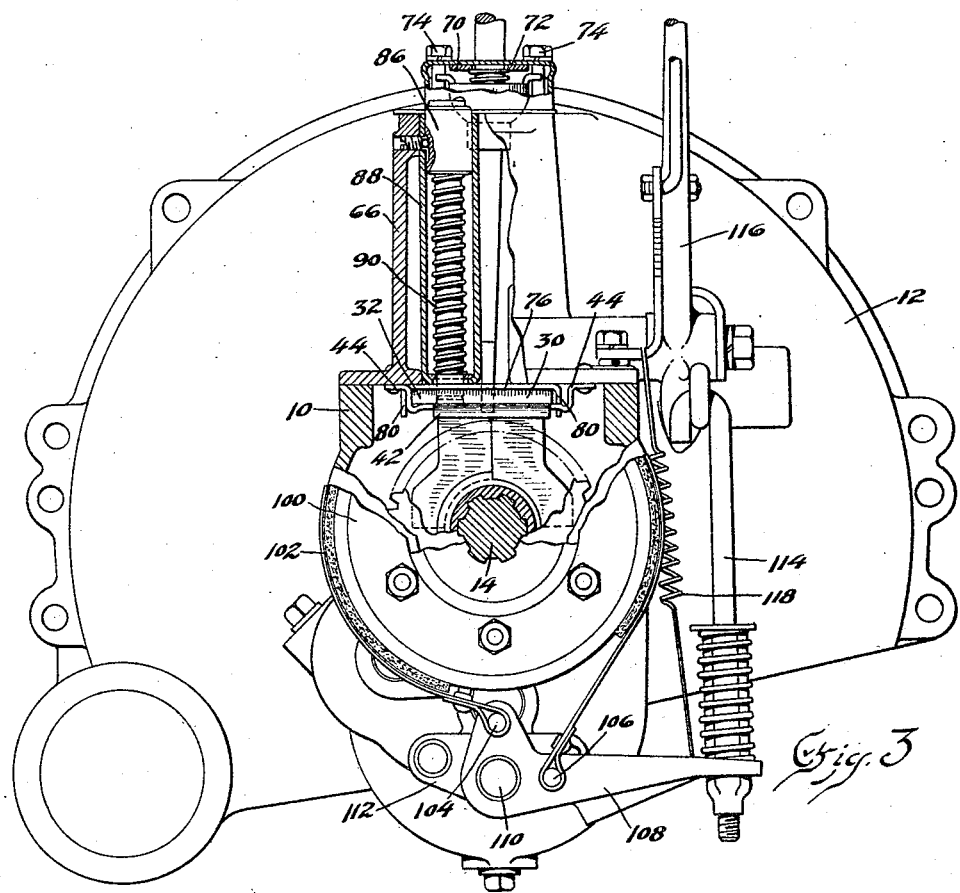
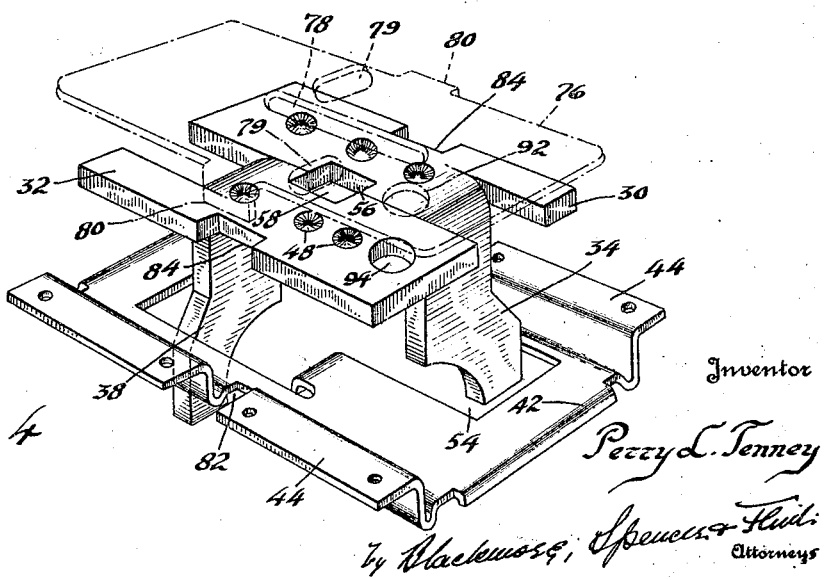

Patented Oct. 2, 1928.

1,686,047

UNITED STATES PATENT OFFICE.

PERRY L. TENNEY, OF MUNCIE, INDIANA, ASSIGNOR TO GENERAL MOTORS CORPORATION, OF DETROIT, MICHIGAN, A CORPORATION OF DELAWARE.

TRANSMISSION LOCKING DEVICE.

Original application filed May 7, 1923, Serial No. 637,230. Divided and this application filed August 2, 1926. Serial No. 126,658.

This invention relates to transmissions and is illustrated as embodied in the gear shifting mechanism of a transmission for an automobile. An object of the invention is to provide inexpensive and readily assembled gear shifting devices which operate positively and a compact arrangement of the braking mechanism.

One important feature of the invention relates to providing gear shifting devices which can be stamped or bent from heavy sheet metal with a minimum of machining, by arranging the sliding gears to be operated by shifter forks, each of which has a vertical operating portion and a slidably supported horizontal portion. In one desirable arrangement the horizontal portions are supported by a plate which is attached to the top of the transmission casing along its edges and which may have an opening suitably formed to permit passage of the vertical portions of the shifter forks.

Another feature of the invention relates to an improved interlocking device which is positively operated and which, while not necessarily limited to such use, is especially well adapted to cooperate with the above described slidably supported shifter forks. In the preferred form, this interlocking device comprises a member which is moved transversely by transverse movement of the gear shifting lever and which has parts operated by such transverse movement to interlock with the idle shifter fork positively to prevent it from moving. In the illustrated embodiment of the invention this member is in the form of a slidable plate having a slot embracing the gear shifting lever, and which has a pair of down turned lugs on its opposite sides so arranged that one of them is moved by the lever into a notch in the outer edge of the idle shifter fork.

From a somewhat different point of view the invention contemplates the provision in a transmission of this type of a simple but highly efficient arrangement of transmission lock, in combination with the gear shifting devices, in such a manner that one shifter fork is locked directly while the other fork is locked indirectly through the medium of an interlocking device such as the slidable plate described above. In the arrangement shown in the drawings, one of the shifter forks is provided with an opening which registers with an opening in the interlocking plate when the plate is in such a position as to lock the opposite shifter fork, and a key-controlled lock is arranged so that its bolt can be projected into the registered openings to lock the mechanism as described.

This application is a division of my application for "transmissions", Ser. No. 637,230, filed May 7, 1923. It is intended to secure protection on the association of the interlocking device and the transmission lock as described in the paragraph above.

Other features of the invention relate to a novel mounting for the gear shifting lever, to a protection for the lock by enclosing it in a hardened steel sleeve, to an efficient and compact arrangement of a transmission brake, and to other novel combinations of parts and desirable particular constructions which will be apparent from the following description of the illustrative embodiment of my invention shown in the accompanying drawings, in which:

Figure 3 is a view partly in end elevation and partly in transverse vertical section showing the arrangement of the key-controlled lock and the transmission brake; and Figure 4 is an exploded perspective view showing some of the parts of the gear shifting mechanism.

Figure 1:
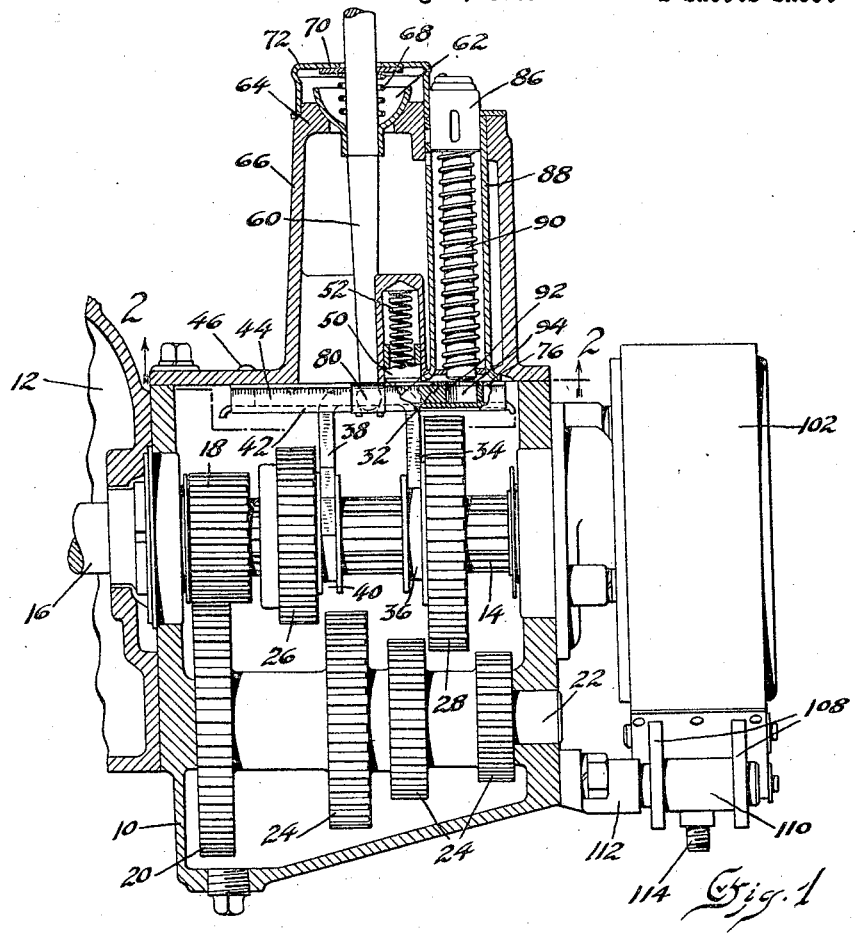
Figure 1 is a view partly in longitudinal vertical section and partly in side elevation showing the improved gear shifting and brake mechanisms in operative relation to the transmission gears.

In the form shown in the drawings the transmission is enclosed in a transmission casing 10 having a clutch housing 12 at one end and in which are arranged in the usual manner a splined driven shaft 14 which is arranged coaxially of a drive shaft 16, there being a gear 18 on the drive shaft 16 meshing with a gear 20 on a counter shaft 22. The counter shaft is provided with gears 24 and the drive shaft 14 is provided with a gear 26 which is axially movable to provide intermediate and high speeds and with a second gear 28 which is axially movable to provide low speed and reverse.

Figure 2:
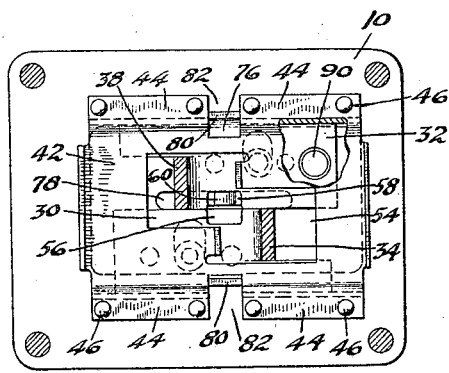
Figure 2 is a section on the line 2—2 of Figure 1 showing some of the parts of the gear shifting mechanism in horizontal section and other parts in bottom plan.

According to the present invention the gears 26 and 28 are controlled by shifter forks 30 and 32, the fork 30 having a vertically extending portion 34 seated in an annular groove 36 formed on gear 28, while the shifter fork 32 has a similar vertically extending portion 38 which seats in an annular groove 40 in a part of gear 26. Each of the forks also has a horizontal portion which is slidably supported by a supporting plate 42 which is turned upwardly at its edges to provide flanges 44 attached to the top of the transmission casing in any suitable manner as by means of bolts or rivets 46. The horizontal portion of each of the shifter forks is provided with three conical depressions 48 arranged to be engaged by the end of a pin 50 urged toward its lowest position by a spring 52 (Figure 1). The pin for each of the shifter forks cooperates with the depressions to determine the neutral and two extreme positions of the fork. As will be apparent from Figures 2 and 4, the plate 42 is spaced from the top of the transmission casing throughout its central portion and this portion is provided with an opening 54, which permits movement of the vertical portions 34 and 38 of the shifter forks.

The horizontal portions of the shifter forks are provided with notches 56 and 58 which are in alinement with each other when the shifter forks are both in neutral position, and which receive the lower rounded end of a vertically extending gear shifting lever 60 which is supported in such a manner that it can be rocked transversely to move the lower end from the one notch into the other, and which can be rocked longitudinally to operate either one of the shifter forks by sliding its horizontal portion along the central portion of the supporting plate 42. In order to permit such movement of lever 60, it carries a semi-spherical sheet metal ball member 62 which forms a ball-and-socket joint with a conical seat formed in a horizontal web 64 of an upwardly extending portion 66 of the cover of the transmission casing 10. Member 62 is held against its seat by a compression spring 68 confined between the semispherical member 62 and a washer 70 slidably engaging the lower surface of the top of a perforated cap 72, which is secured to the top of portion 66 by means of screws 74 or in any other suitable manner.

According to an important feature of the invention, there is arranged between the horizontal portions of the shifter forks and the lower surface of the top of the transmission casing an interlocking plate 76 shown in dot and dash lines in Figure 4 and in its assembled relation in the other views. This interlocking plate has a longitudinally extending central slot 78 which embraces the lower end of the gear shifting lever 60 in such a manner that the plate is moved transversely by transverse movement of the lever but is not affected by longitudinal movement of the lever. The plate 76 is also provided with transversely extending slots 79 for the passage of the spring pressed pins 50. The opposite edges of the interlocking plate have down-turned lugs 80, which pass through slots 82 formed in the flanges 44 of the supporting plate, and which are spaced from each other on opposite sides of the interlocking plate 76 at such a distance that transverse movement of lever 60 operates to move that one of the lugs 80 which is on the side of the interlocking plate toward which the lever is moving out of its interlocking notch 84 (one of which is formed in the outside edge of the horizontal portion of each of the shifter forks) while at the same time the opposite lug 80 is moved into its notch 84 positively to prevent movement of the idle shifter fork. By this arrangement when the lever is rocked transversely to move it from notch 58 into notch 56 or vice versa, the active shifter fork will be unlocked by movement of the lever while the idle shifter fork will be positively locked by interengagement of its notch 84 with the corresponding lug 80.

The invention also contemplates locking the transmission by a key-controlled lock 86 of any desired form which is protected against tampering by being housed in a hardened steel sleeve 88, and which has a bolt 90 arranged to be projected into an opening 92 in the interlocking plate 76 and an opening 94 in the shifter fork 32 when these openings register with each other. It will be observed that, before the transmission can be locked, it is necessary to rock the lever 60 to bring its lower end into the notch 58, thus moving the interlocking plate 76 in such a manner as to interlock with the shifter fork 30, and at the same time to register the openings 92 and 94. Thus, after the lock has been manipulated to project the bolt 90 downwardly, the shifter fork 32 is directly locked by the bolt, and the shifter fork 30 is indirectly locked by the bolt through the medium of the interlocking plate 76.

At the end of the transmission casing opposite the clutch housing 12 a brake drum 100 is keyed to the driven shaft 14 and is surrounded by a contractable brake band 102 faced with friction material and having bifurcated ends secured to cross pins 104 and 106 carrier by bell crank levers 108 pivoted at 100 on a bracket 112 secured to the transmission casing. The operating arms of the bell crank levers 108 extend transversely beyond the drum 100 and are connected or bridged at their outer ends by a part (which may be integral with the lever if desired) through which passes the lower end of an operating link 114 connected at its upper end to a rearwardly extending arm of a bell crank lever 116, which may be the usual emergency brake operating lever. The bell crank levers 108 are urged toward their upper or idle positions by a spring 118. Manipulation of the emergency brake lever 116 to rock the bell crank levers 108 in a clockwise direction contracts the band 102 to exert a braking force on the shaft 14 through the drum 100.

While one illustrative embodiment of my invention has been described in detail it is not my intention to limit its scope to that embodiment or otherwise than by the terms of the appended claims.

I claim:

1. A transmission lock comprising, in combination, shifter forks, a lever movable into a position to operate either fork, an interlocking device positively operated by the lever to prevent movement of the idle fork, and a lock including a bolt movable into locking engagement with the interlocking device and one shifter fork.

2. A transmission lock comprising, in combination, shifter forks, a lever transversely movable to positions for operating either fork, an interlocking device positively moved by the lever in its transverse movement to prevent actuation of the idle fork, and a lock comprising means to positively engage the interlocking device and the active fork when the lever has been transversely shifted.

3. A transmission lock comprising, in combination, shifter forks, a lever movable to positions for operating either fork, an interlocking device positively moved by the lever, a reciprocating locking bolt, one of said forks having an opening positioned to receive said locking bolt, the interlocking device having an opening registering with the fork opening when the lever is shifted to a position from which it may actuate the aforesaid fork.

4. A transmission lock comprising, in combination, a pair of shifter forks, a gear shifting lever operating either of the forks, an interlocking device operated by the lever to prevent movement of the idle fork, and a lock constructed and arranged to lock the fork which is in active position directly and to lock the fork which is in idle position through the interlocking device.

5. A transmission lock comprising, in combination, a pair of shifter forks, a lever to operate either of the forks, a device operated by the lever to interlock with and prevent movement of the idle fork, and a transmission lock which locks the interlocking device and thus prevents movement of the idle fork.

6. A transmission lock comprising, in combination, a pair of shifter forks, an interlocking device which prevents movement of the idle fork, one of the forks and said device being provided with openings, and a transmission lock having a bolt arranged to be projected through the openings to lock the one fork directly and to lock the other fork through the interlocking device.

7. A transmission lock comprising, in combination, a pair of shifter forks having slidably supported horizontal portions with notches in their outer edges, and one of which horizontal portions is provided with an opening, a sliding interlocking plate having down turned lugs so arranged that one of them seats in the notch of the idle fork and having an opening which registers with the opening in the horizontal portion of the one fork when the other fork is locked, and a transmission lock having a bolt arranged to be projected through the registered openings.

In testimony whereof I affix my signature.

PERRY L. TENNEY.